Feb. 12, 1952 E. H. GRONLUND 2,585,310
LUNCH BOX
Filed Nov. 4, 1949 2 SHEETS—SHEET 1

INVENTOR.
ERNST H. GRONLUND.
BY
ATTORNEY.

Feb. 12, 1952     E. H. GRONLUND     2,585,310
LUNCH BOX

Filed Nov. 4, 1949     2 SHEETS—SHEET 2

INVENTOR.
ERNST H. GRONLUND.
BY
ATTORNEY.

Patented Feb. 12, 1952

2,585,310

UNITED STATES PATENT OFFICE 2,585,310

LUNCH BOX

Ernst H. Gronlund, Algonac, Mich., assignor to Electrolunch Co., Algonac, Mich., a copartnership Application November 4, 1949, Serial No. 125,536

7 Claims. (Cl. 219—19)

My invention relates to a new and useful improvement in an electrically heated lunch box and has for its object the provision of a lunch box so arranged and constructed that the contents thereof may be heated to any desired temperature within proper limits.

Another object of the invention is the provision of a lunch box so constructed and arranged that a heating unit and a compartment container may be easily and quickly mounted in the lunch box.

Another object of the invention is the provision in an electrically heated lunch box of means whereby the temperature may be adjusted to various degrees.

Another object of the invention is the provision in a lunch box of this class of a compartment forming container so arranged and constructed that articles may be placed therein and retained in separated relation for facilitating the transference of heat.

Another object of the invention is the provision of an electrically heated lunch box so constructed and arranged that it will be simple in structure, economical of manufacture, durable, compact and highly efficient to use.

Other objects will appear hereinafter.

It is recognized that various modifications and changes may be made in the detail of structure illustrated and it is understood that the form illustrated is but the preferred embodiment.

Forming a part of this specification are drawings in which.

Figure 1:
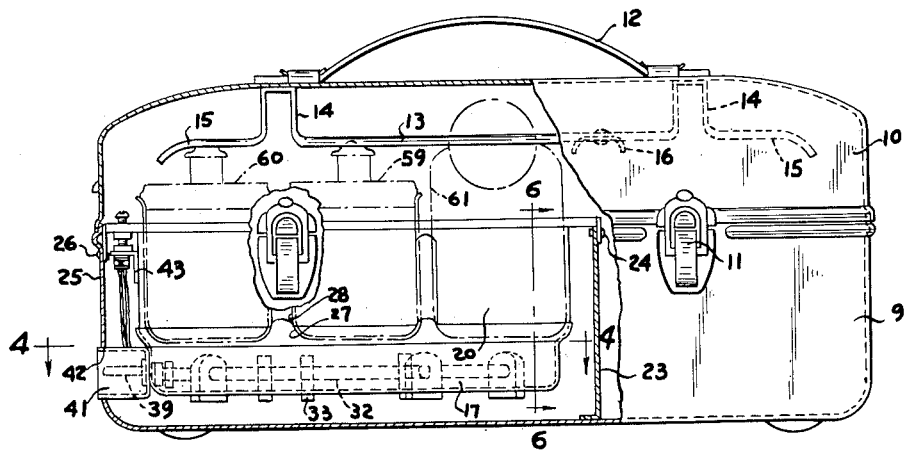
Fig. 1 is a side elevational view of the invention with parts broken away and parts shown in section.
Figure 2:
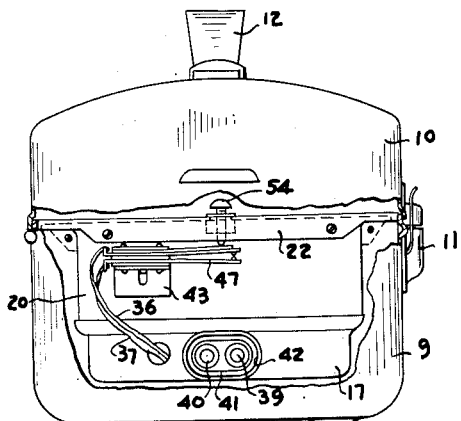
Fig. 2 is an end elevational view of the invention with parts broken away.
Figure 6:
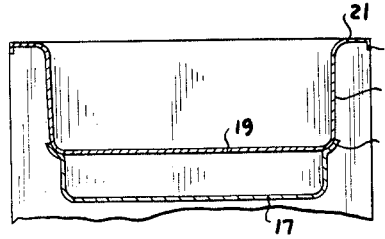
Fig. 6 is a fragmentary sectional view taken on line 6—6 of Fig. 1.

As shown in the drawings, the lunch box comprises a lower section 9 and an upper section 10 hingedly connected together and secured in closed position by the clasp 11 and having a handle 12 mounted on the upper section 10. A metallic strip 13 is provided intermediate its ends with a U-shaped angularly turned portion 14 which is secured to the inner surface of the cover section 10, and projecting outwardly from which are the resilient extension bars or tongues 15.

A heater housing 17 is provided with the flared edges 18 which are adapted to seat against a container 20, having an outwardly projecting flange 21 at its upper edge provided with a downwardly projecting flange 22. Mounted in the section 9 is a transverse partition 23 to which the flange 22 is fastened by means of the rivet or screw 24. This flange 22 is also fastened to the walls of the lower section 9 by means of the screws or rivets 26, this being shown in Fig. 1 as being thus secured to the end wall 25 of the lower section 9.

The heater housing 17 is provided at its edges with the inwardly pressed grooves 27 to nest with the inwardly pressed grooves 28 formed in the walls of the container 20 so that there are thus provided, on the interior of the container 20 the separating or circulating beads or ribs 29 and 30, the ribs 29 being formed in the bottom 19 and the ribs 30 in the side walls. In these beads or ribs 29 are formed openings 31.

Mounted in the housing 17 is a heating element 32 secured therein by means of the retaining blocks 33 formed from insulating material. One end of the heating element 32 is connected to the terminal 34 to which is also connected one end of the wire 36. The opposite end of the heating element 32 is connected to the terminal 35. This terminal 35 is connected to the end of the metallic prong 39 which is mounted in the block 41. This prong 39 is in spaced relation to the prong 40 which connects to the terminal 37 to which one end of the wire 38 is attached. There is thus provided a plug-in socket, the block 41 being projected into the opening 42 formed in the end wall 25.

Figure 7:
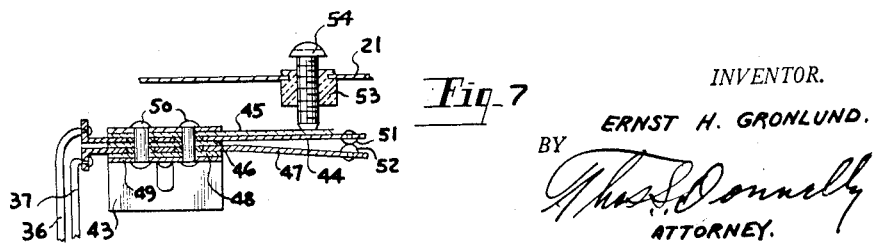
Fig. 7 is a fragmentary sectional view showing the thermostat used in the invention.

Mounted on the container 20 is a bracket 43 on which is mounted a resilient metallic plate 44 insulated from the bracket 43 by means of a layer 45 of insulating material. This contact plate 44 is insulated by the layer 46 of insulating material from the contact plate 47 which is bi-metallic and which also is insulated by the layer of insulation 48 from the metallic plate 49 through which are extended the rivets 50. Mounted on the contact plate 44 is the contact 51 and mounted on the plate 47 is the contact 52, these contacts being adapted to engage. A wire 36 is connected to the plate 44 and the wire 37 is connected with the plate 47. The construction is such that when the temperature of the interior of the lunch box reaches a predetermined degree, the plate 47 will curl so as to withdraw the contact 52 from engagement with the contact 51, thus breaking the circuit to the heating element 32. Mounted in the flange 21 is a nut 53 of insulating material through which is threaded the adjusting screw 54 which bears against the insulating plate 45. The construction is such that by turning the screw 54 downwardly as shown in Fig. 7 the plate 44 will be flexed downwardly so that a higher degree of temperature would be required in order to have the contacts 51 and 52 disengage. Similarly by unthreading the screw and allowing the plate 44 to spring upwardly, a situation would be developed where the contacts 51 and 52 would separate at a lower temperature.

Figure 3:
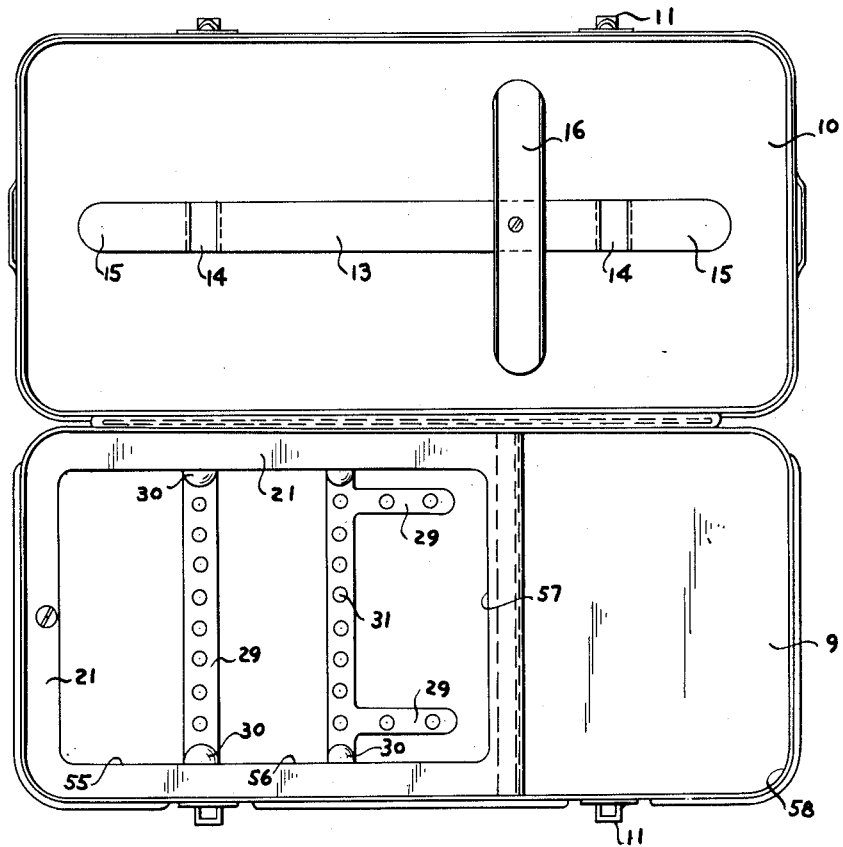
Fig. 3 is a top plan view of the invention in open form.
Figure 4:
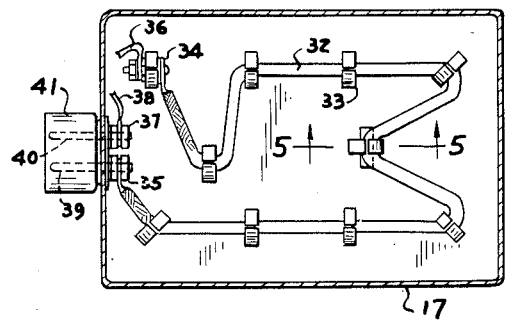
Fig. 4 is a reduced view taken on line 4—4 of Fig. 1.
Figure 5:
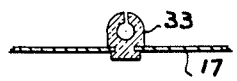
Fig. 5 is a fragmentary sectional view taken on line 5—5 of Fig. 4.

As shown in Fig. 3, the ribs 29 and 30 serve to separate the compartments 55, 56 and 57 and the partition 23 forms, with the end wall of the lower section 9, a compartment 58 in which various articles may be deposited. As shown in Fig. 1, receptacles 59, 60 and 61 may be mounted in the housing 20 between the ribs and the end wall and these receptacles are held in position through their engagement with either the members 13 or 15. Likewise, articles may be deposited in the compartment 58 which would be held in position by means of the paneled cross bar 16 or the tongue 15.

In use the user would place in the compartment 58 such articles as sandwiches, bread, cake, etc., and in the receptacles 59, 60 and 61 would be placed those articles of food which it is desired to consume while hot. Shortly before using the food contained in the lunch box, the user would plug into the socket plug so that the heating element 32 would be energized. The heat generated in the housing 17 would pass upwardly through the channels 30 on the outside of the housing 20 and also along the bottom through the channels formed by the beads 29 and pass outwardly through the openings 31 into the interior of the housing 20. The formation is such that a ready circulation of the heated air would be effected and a rapid heating of the contents of the lunch box accomplished. By setting the screw 54 at the desired position, the circuit would be broken when the desired temperature of the food contained within the lunch box had been reached.

By removing the screws 24 and 26, the housing 20 and 17 may be easily and quickly removed from the lower section 9 so that the lunch box may be used without the heating element when desired and the heating element thus is rendered accessible for repair and similar operations. The housing 17 and container 20 are, as already shown, constructed as a unit. After the fabrication of this unit, the same is inserted in the lunch box proper. In the form shown, there is sufficient clearance between the partition 23 and the end of this unit, to permit the insertion of the unit into place and its removal therefrom. It is believed obvious that the partition 23 may be removed, if desired, as the fastening of this unit on three sides to the lunch box will suffice to hold the unit rigid. Consequently, the lunch box need not be specifically built as the unit may be mounted in any lunch box of the proper size.

Experience has shown that a lunch box constructed in this manner is most highly efficient, compact and economical.

What I claim is:

1. In an electrically heated lunch box; a heater housing; a heating element mounted in said housing, said housing being open at its upper end; a container open at its upper end and seated at its lower end in the open end of said housing and secured thereto; a lower section of a lunch box; a partition in said lunch box; a flange on said container; and securing means for securing said flange to said partition and to said lunch box section.

2. In an electrically heated lunch box; a heater housing; a heating element mounted in said housing; said housing being open at its upper end; a container open at its upper end and seated at its lower end in the open end of said housing and secured thereto; a lower section of a lunch box; a partition in said lunch box; a flange on said container; and securing means for securing said flange to said partition and to said lunch box section; a wall on said lunch box section having an opening formed therethrough; an electrical terminal connected to said electric heating element and accessible through said opening.

3. In an electrically heated lunch box; a lower section of the lunch box open at its top; a composite unit positioned in said section and comprising a heater housing and a container, said heater housing being open at its top and said container nesting at its bottom in the top of said housing; a wall on said lunch box section having an opening formed therein; an electric heating element in said housing; terminals on said heating element accessible through the opening in said wall, said housing and said container being secured together in said nesting relation; and spacing ribs projecting inwardly from the inner face of said container intermediate its ends for spacing apart articles positioned in said container.

4. In an electrically heated lunch box; a lower section of the lunch box open at its top; a composite unit positioned in said section and comprising a heater housing and a container, said heater housing being open at its top and said container nesting at its bottom in the top of said housing; a wall on said lunch box section having an opening formed therein; an electric heating element in said housing; terminals on said heating element accessible through the opening in said wall, said housing and said container being secured together in said nesting relation; and spacing ribs projecting inwardly from the inner face of said container intermediate its ends for spacing apart articles positioned in said container; an electric circuit to said heating element; a thermostatically controlled switch in said circuit mounted on said container.

5. In an electrically heated lunch box; a lower section of the lunch box open at its top; a composite unit positioned in said section and comprising a heater housing and a container, said heater housing being open at its top and said container nesting at its bottom in the top of said housing; a wall on said lunch box section having an opening formed therein; an electric heating element in said housing; terminals on said heating element accessible through the opening in said wall, said housing and said container being secured together in said nesting relation; and spacing ribs projecting inwardly from the inner face of said container intermediate its ends for spacing apart articles positioned in said container; an electric circuit to said heating element; a thermostatically controlled switch in said circuit mounted on said container, and means on said container for adjusting said switch.

6. In an electrically heated lunch box a heater housing; a heating element mounted in said housing, said housing being open at its upper end; a container positioned above said heater housing and composite therewith; a lower section of a lunch box; a partition in said lunch box; a flange on said container; securing means for securing said flange to said partition.

7. In an electrically heated lunch box a heater housing; a heating element mounted in said housing, said housing being open at its upper end; a container positioned above said heater housing and composite therewith; a lower section of a lunch box; a partition in said lunch box; a flange on said container; securing means for securing said flange to said partition; and a wall on said lunch box section having an opening therethrough and an electrical terminal connected to said electric heating element and accessible through said opening.

ERNST H. GRONLUND.

REFERENCES CITED

The following references are of record in the file of this patent:

UNITED STATES PATENTS

| Number | Name | Date |
|---|---|---|
| 1,054,318 | Schwartz | Feb. 25, 1913 |
| 1,979,222 | Goodwin | Oct. 30, 1934 |
| 2,146,608 | Welle | Feb. 7, 1939 |
| 2,187,196 | Douglass | Jan. 16, 1940 |